United States Patent [19]
Pfeil et al.

[11] Patent Number: 5,420,227
[45] Date of Patent: May 30, 1995

[54] MODIFIED ACID POLYESTERS AND THEIR USE AS CURING AGENTS IN HEAT-CURABLE BINDERS

[75] Inventors: Armin Pfeil; Paul Oberressl; Reiner-Kurt Illgen, all of Wiesbaden, Germany

[73] Assignee: Hoechst AG, Germany

[21] Appl. No.: 166,312

[22] Filed: Dec. 10, 1993

[30] Foreign Application Priority Data

Dec. 14, 1992 [DE] Germany .................. 42 42 052.0

[51] Int. Cl.$^6$ .............................................. C08G 63/52
[52] U.S. Cl. ..................................... 528/303; 528/272; 528/296; 528/302; 525/437; 525/449
[58] Field of Search ............... 528/272, 302, 303, 296; 525/437, 449

[56] References Cited

U.S. PATENT DOCUMENTS

| | | | |
|---|---|---|---|
| 3,412,056 | 11/1968 | Crawford et al. | 524/600 |
| 3,477,976 | 11/1969 | Nakamuro et al. | 525/443 |
| 3,548,026 | 12/1970 | Weisfield et al. | 525/533 |
| 3,812,064 | 5/1974 | Nichols et al. | 528/111.3 |
| 4,246,367 | 1/1981 | Curtis, Jr. | 525/49 |
| 4,276,388 | 6/1981 | Iwami et al. | 525/48 |
| 4,355,136 | 10/1982 | Dombroski et al. | 525/35 |
| 5,157,073 | 10/1992 | Kunz | 524/560 |

FOREIGN PATENT DOCUMENTS 1495142 8/1969 Germany .
1719322 8/1971 Germany .

OTHER PUBLICATIONS

Copy of Search Report (3 pages).
Copy of Abstract No.: JP56018660 (2 pages).
Copy of Abstract No.: J50157424 (1 page).
Copy of Abstract No.: JP50137206 (a page).

*Primary Examiner*—Samuel A. Acquah
*Attorney, Agent, or Firm*—Bierman and Muserlian

[57] ABSTRACT

Modified acid polyesters obtained by reaction of polyols with unsaturated polycarboxylic acids or anhydrides thereof and conjugated dienoic acids. These products are suitable as curing agents for epoxy resins, in particular for curing tin can finishes.

20 Claims, No Drawings

MODIFIED ACID POLYESTERS AND THEIR USE AS CURING AGENTS IN HEAT-CURABLE BINDERS

It is known to use polycarboxylic acids or anhydrides thereof as curing agents for heat-curable binders. The curable binders used are epoxy resins, but also polyesters for baking enamels and powder resins. However, only a limited selection of acids are available as curing agents, and the acids have a tendency to sublime at the baking temperatures, their melting point is often higher than the baking temperature, they are sparingly soluble in the solvents required or in the binder and they often lead to brittle films, as a result of which flexiblizing additives are required.

These disadvantageous properties have made it necessary to develop carboxyl-containing modified polyesters based on aromatic carboxylic acids (for example trimellitic acid, pyromellitic acid) for use as curing agents, which have brought an improvement in many of these properties. They can be used wherever higher baking temperatures are employed, for example in primers, topcoats, single-coat finishes, shock-drying systems for coil-coating and in the coating of tin cans.

Specifically in the last-mentioned area of application, where the product comes into contact with foods, particularly high demands are placed on the binder and thus on the curing agent. The resin components used for the coating of tin cans with white varnishes are exclusively epoxy resins, and the curing agents are exclusively products based essentially on trimellitic acid. In terms of toxicology, there are reservations against the use of trimellitic acid.

Accordingly, the object was to develop a curing agent based on aliphatic polycarboxylic acids which is generally suitable for epoxy resins and polyesters as heat-curable binders and powder resins. Particular importance was given to their use in can-coating, the availability and the approval for use with food playing a decisive part in selecting the raw materials.

It was found that prior art carboxyl-containing polyesters obtained from polyols and aliphatic dicarboxylic acids or anhydrides thereof are only insufficiently suitable for use as curing agents for epoxy resins (U.S. Pat. No. 2,683,131, British Patent Specification 939,358, U.S. Pat. No. 3,027,279) for use in can-coating. The degree of crosslinking and stability to sterilization are far from achieving the quality of the currently commonly used trimellitic acid curing agents.

It has now been found that the stated object can be achieved by providing an acid polyester which is synthesized from unsaturated polycarboxylic acids and conjugated dienoic acids.

The invention relates to acid polyesters obtained by reaction of polyols with unsaturated polycarboxylic acids or anhydrides thereof and conjugated dienoic acids.

Examples of polyols include: ethane-1,2-diol, diethylene glycol, triethylene glycol, propane-1,2-diol, dipropylene glycol, propane-1,3-diol, 2,2-dimethylpropane-1,3-diol, butane-1,4-diol, hexane-1,6-diol, 2-ethyl-2-methylpropane-1,3-diol, bis(4-hydroxycyclohexyl)methane, 2,2bis(4-hydroxycyclohexyl)propane, 2,2-bis(4-(2-hydroxyethoxy)phenyl)propane, 3(4),8(9)-bis(hydroxymethyl)tricyclo[5.2.1.0$^{2,6}$]decane, 1,1,1-trimethylolethane, 1,1,1-trimethylolpropane, pentaerythritol, dipentaerythritol, bis(2,2-bis(hydroxymethyl)butyl) ether, 1,4-bis(hydroxymethyl)cyclohexane, 2,2-bis(hydroxymethyl)propionic acid, glycerol, diglycerol, sugar alcohols, such as sorbitol, mannitol.

Examples of unsaturated polycarboxylic acids include: maleic acid, mesaconic acid, citraconic acid, aconitic acid, fumaric acid, monochloromaleic acid, monobromomaleic acid, dichloromaleic acid and anhydrides thereof, where possible.

Examples of conjugated dienoic acids include: sorbic acid, muconic acid, unsaturated fatty acids containing conjugated diene units (so-called conjuenoic acids), pentadienecarboxylic acid, abietic acid.

In each case, not only the pure compounds but also mixtures are suitable. By using suitable mixtures of polyols and unsaturated polycarboxylic acids, it is possible to specifically control degree of branching, functionality, acid number and hence important properties of the products.

Preparation of these acid polyesters is effected by a combination of esterification and Diels-Alder reaction. Depending on the order in which the starting materials are reacted, the following three different process variants are in principle possible:

1. Reaction of the polyol with the unsaturated polycarboxylic acid or the anhydride thereof to give an unsaturated, acid polyester to which the dienoic acid is attached by cycloaddition;
2. Esterification of the polyol with the dienoic acid to give the polyester, followed by cycloaddition of the unsaturated polycarboxylic acid or the anhydride thereof;
3. Cycloaddition of the unsaturated polycarboxylic acid with the dienoic acid, followed by reaction with the polyol.

In all cases, either mixtures of the starting compounds or the pure starting compounds can be used. The reactions can be carried out either in suitable solvents or, alternatively, depending on the melting point of the starting compounds, preferably in the melt.

Suitable solvents for the esterification are, if water has to be removed, those forming an azeotrope with water, such as, for example, xylene, toluene. It is possible to use suitable catalysts, examples of which include: sulfuric acid, phosphoric acid, toluenesulfonic acid and the like. However, during esterification of dienoic acids, the acid catalyst can cause them to polymerize.

The cycloaddition can be carried out in suitable inert solvents, such as xylene, toluene, and the catalysts used may include Lewis acids, such as aluminum(III) chloride and boron(III) fluoride.

However, in order to avoid using solvents and to increase the rate of reaction and the conversion, it is preferred to carry out the reaction in the melt. Furthermore, it may be desirable to effect isomerizations and adduct formation with the ethylenic double bonds to a limited extent at elevated temperatures, so as to exert a favorable effect, for example, on the solubility or on the crystallization tendency of the product. It is likewise preferred to make the use of catalysts unnecessary by suitable selection of the process.

For all these reasons, it is particularly preferred to carry out the reactions by process 1 and to use anhydrides of the unsaturated polycarboxylic acids. To this end, this component is introduced first as an anhydride (or a mixture of anhydrides) in molten form and reacted with the polyol (mixture) at temperatures of between 60° and 200° C., in particular between 80° and 130° C. until a constant acid number is reached [Z. Ordelt, Farbe und Lack 75 (6), 523, 1969 and DD 256,516 A1]. If the OH groups are not reactive enough, it is possible, if desired, to use catalysts, so as to improve conversion and reaction time, for example tertiary amines (1-N,N-dimethylamino-3-formylpropane, N-dimethylbenzylamine, N,N-dimethyl-4-aminopyridine, dimorpholinoethane) and organic tin compounds or phosphorus compounds (tin dioctoate, dibutyltin dilaurate, triphenylphosphine). This is followed by reaction with the dienoic acid (or a mixture thereof) at a temperature above the melting temperature of the half-esterified polycarboxylic acid thus obtained and above the melting temperature of this dienoic acid, i.e. at 100° to 200° C., in particular between 120° and 160° C. until no more free dienoic acid can be detected. Unconverted, volatile products are distilled off in vacuo. Depending on the desired area of application, the product according to the invention can then be taken up in a suitable solvent or be discharged as a melt. In this manner, a carboxyl-containing, anhydride-free product is obtained. The advantages of this variant are as follows: no solvent is required, a catalyst is not absolutely necessary, the space-time yield is high, no by-products are cleaved. off, no side reactions take place, the product distribution can be controlled via the temperature, and almost colorless products are obtained.

If it is desired to prepare an anhydride-containing product it is better to carry out the reactions by variant 2 by subjecting the anhydride (mixture) to a cycloaddition with the previously formed neutral, diene ester. The preceding esterification has to be carried out in a solvent which forms an azeotrope with water with the use of a suitable catalyst (for example sulfuric acid, p-toluenesulfonic acid, phosphoric acid and the like); the conditions selected must be such that the polymerization of the dienoic acid is suppressed compared with the esterification reaction (U.S. Pat. No. 2,462,337). The ester is immediately reacted in the reaction medium with the anhydride, and the solvent is, if required, distilled off.

Finally, variant 3 is likewise carried out in the melt, higher temperatures being usually necessary for this. Accordingly, this variant does not give such favorable color values as variant 1. However, preference should be given to this variant if the reactivity between unsaturated ester and dienoic acid is not sufficiently high. As a rule, the cyclic anhydrides of the unsaturated carboxylic acids show better reactivity in the cycloaddition than the corresponding half-esters.

The relative amounts of polyol and unsaturated polycarboxylic acid are selected such that the hydroxyl equivalent/acid equivalent ratio is 1:0.8 to 0.8:1, preferably 1:0.85 to 1:0.95. The relative amounts of unsaturated polycarboxylic acid (anhydride) and dienoic acid are selected such that the dienophile equivalent/enophile equivalent ratio is 1:0.8 to 0.8:1, but preferably 1:0.85 to 1:0.95. Very particularly preferably, within the abovementioned limits, there are simultaneously fewer polycarboxylic acid (anhydride) equivalents than polyol equivalents and fewer dienoic acid equivalents than polycarboxylic acid (anhydride) equivalents. The acid polyesters thus obtained are brittle, light-colored to colorless compounds having a melting range of 25° C. to 200° C., preferably 50° C. to 150° C., and acid numbers of between 40 and 800, preferably between 80 and 650. They are easily comminutable or soluble in solvents at a high solids content. Suitable solvents are polar, preferably aprotic, solvents, for example ketones (butanone, 4-methylpentan-2-one, isophorone, 3,3,5-trimethylcyclohexanone, 2,6-dimethylheptan-4-one, 2,4-dimethylpentan-3-one, 2-methoxy-2-methylpentan-4-one, 2-hydroxy-2-methylpentan-4-one) or ethers (1,2-dimethoxyethane, diethylene glycol dimethyl ether, dipropylene glycol dimethyl ether, propylene glycol dibutyl ether) or esters (ethyl pivalate, 1-ethoxy-2-propyl acetate, 1-methoxy-2-propyl acetate, ethyl 3-ethoxypropionate, 1,2-propylene glycol diacetate).

The acid polyesters thus obtained are very useful curing agents for epoxy resins. However, preferably, the acid polyesters are not used as curing agents in the form described above but are first converted into a precondensation product using a less than stoichiometric amount of epoxy resin. In this manner, the solubility, compatibility and reactivity of such a one-component binder can be improved. The epoxy resin to be cured is mixed with the uncondensed or precondensed acid polyester at 50° to 120° C. in a ratio of 95:5 to 40:60, preferably 15:1 to 3:1 (relative to the solid resin) until a homogeneous mixture is obtained. The binder is then ready for use.

Formulation of the precondensation product can be carried out such that the acid polyester according to the invention dissolved in a suitable solvent is precondensed with less than a stoichiometric amount of polyepoxide, the acid group/epoxy group ratio being between 100:1 and 1.1:1, preferably between 40:1 and 2:1, very particularly preferably between 30:1 and 10:1. The resulting precondensation product is then mixed with the epoxy resin to be cured, which, if desired, has been dissolved in a suitable solvent. If the same epoxide is used for precondensation and for curing, precondensation is preferably carried out in such a manner that the acid polyester is mixed with the entire amount of epoxide and subjected to an elevated temperature for a limited period of time, during which some of the mixture undergoes a prereaction.

Examples of epoxides include: epoxy ethers of polyhydric phenols (resorcinol, hydroquinone, bis(4-hydroxyphenyl)methane, bis(4-hydroxy-3-methylphenyl)methane, bis(4-hydroxy-3,5-dibromophenyl)methane, 2,2-bis(4-hydroxyphenyl)propane, 1,1-bis(4-hydroxyphenyl)cyclohexane and phenol/formaldehyde condensation products) and of polyhydric alcohols (butanediols, hexanediols, glycerol, pentaerythritol, sugar alcohols and the like). It is also possible to use oligomers of the polyepoxides described above. A detailed list is given in the handbook "Epoxid-verbindungen und Epoxidharze" by A. M. Paquin, Springer Verlag, Berlin 1958, Chapter IV, and in Lee, Neville, "Handbook of Epoxy Resins", 1967, Chapter 2.

Particularly preferred epoxy resins not only for precondensation but also for the resin to be cured are those based on 2,2-bis(4-hydroxyphenyl)propane (bisphenol A, dian) having an average molecular weight of 340–8,000. The above polyepoxides can be used individually or in a mixture, if desired also in a mixture with monoepoxides.

The solvents used for the 1-component binders are polar, preferably aprotic, solvents, for example ketones (butanone, 4-methylpentan-2-one, isophorone, 3,3,5-trimethylcyclohexanone, 2,6-dimethylheptan-4-one, 2,4-dimethylpentan-3-one, 2-hydroxy-2-methylpentan-4-one, 2-methoxy-2-methylpentan-4-one) or ethers (1,2-dimethoxyethane, diethylene glycol dimethyl ether, dipropylene glycol dimethyl ether, propylene glycol dibutyl ether) or esters (ethyl pivalate, 1-ethoxy-2-propyl acetate, 1-methoxy-2-propyl acetate, ethyl 3-ethoxypropionate, 1,2-propylene glycol diacetate). Protic solvents, for example sec.-butanol and tert.-butanol, are of limited suitability. Mixtures of the abovementioned solvents are also used, including those combined with aromatic hydrocarbons, such as toluene, xylene and a more highly alkylated aromatic.

Owing to their high reactivity, long shelf life and solubility, the binders containing the acid polyesters according to the invention as such or in the form of their precondensation products as described above have many uses. They can be used wherever baking temperatures above 100° C., preferably above 140° C., are employed, for example in the paints sector, such as primers, topcoats, single-coat finishes, shock-drying systems for coilcoating and for the coating of tin cans. The high reactivity of the binders becomes particularly apparent when baking takes place within a very short period of time, for example 1 to 3 minutes, and at relatively high temperatures, for example at an object temperature of 200° C. to 250° C.

The reactivity of the binder can be increased further by addition of suitable catalysts. Suitable catalysts, which may be added, for example, in an amount of 0.01 to 5, preferably 0.05 to 1.5, % by weight (relative to total solids), include alkali metal salts, basic catalysts of inorganic or organic nature, such as lithium salts, sodium salts or potassium salts of weak organic and inorganic acids (for example boric acid, benzoic acid, acetic acid, 2-ethylhexanoic acid and other aliphatic carboxylic acids), titanium compounds, tin compounds (for example tin(II) octoate, dibutyltin oxide, dibutyltin dichloride, dibutyltin dilaurate), organic bases (trialkylamines, such as, for example, tributylamine, triethanolamine, benzyldimethylamine; cyclic bases, such as, for example, diazabicyclooctane, imidazole, aryl- and alkylimidazoles, imidazolines), organic and inorganic phosphorus compounds (for example triphenyl phosphite, phosphoric acids, monoesters of phosphoric acid with aliphatic alcohols), acids (for example p-toluenesulfonic acid, 1,5-naphthalenedisulfonic acid, heteropolyacids), in each case individually or in a mixture, for example combinations of the abovementioned basic compounds with others of the abovementioned catalysts.

The binders are suitable in particular for producing over-coatings and inter-coatings which are resistant to corrosion, chemicals, sterilization and the like for a wide range of applications, such as, for example, lining of articles which come into contact with aggressive media, such as fuels, solvents or foods (even for an extended period of time). A particularly preferred area of application are single-coat finishes on sheet metal which is converted into its use form by subsequent deepdrawing, bordering, profiling, stamping or the like. The binders are suitable in particular, given appropriate selection of the starting compounds, for those applications where thin layers (0.5–20 μm, preferably 2–10 μm, and very particularly preferably 3–8 μm) of good sterilization stability have to be produced, for example, by deep-drawing.

The coatings can be produced on a variety of substrates as long as these withstand the curing temperatures of the coating. Examples of suitable substrates are: ceramics, wood, glass, concrete, plastics, preferably metals, such as, for example, iron, zinc, tin, titanium, copper, aluminum, steel, magnesium, brass or bronze, it being possible for the substrates (metals) to be used on their own or in a composite, in pretreated or nonpretreated form. The pretreatment methods include: suitable thermal, mechanical or chemical methods for increasing adhesion and corrosion resistance. However, the binders are also distinguished by good adhesion on non-pretreated metal substrates.

The binders can be used on their own or as a mixture with other binders and/or polymers, or flow-improving agents, adhesives, catalysts or similar additives known to one skilled in the art and suitable for this purpose.

The binders suitable for the combination are OH-containing amine, melamine, guanamine, novolak and, in particular, phenolic resins and OH-containing polyesters or homo- and/or copolymers. The combining partners can be incorporated therein, if suitably selected, in up to a total amount of 50% by weight, preferably up to 30% by weight, and very particularly preferably up to 10% by weight.

The binders can be applied as a clearcoat, powder coating and/or with the use of suitable (acid-resistant) pigments and fillers (spray-coating, roller-coating, dip-coating). Examples of pigments and fillers include: titanium dioxide, graphite, carbon black, zinc chromate, strontium chromate, barium chromate, lead chromate, lead cyanamide, lead silicochromate, calcium molybdate, manganese phosphate, zinc oxide, cadmium sulfide, chromium oxide, zinc sulfide, nickel-titanium yellow, chromium-titanium yellow, iron oxide black, iron oxide red, ultramarine blue, phthalocyanine complexes, naphthol red or the like. Surprisingly, it is immaterial whether the coloring pigments or of inorganic or organic nature. Furthermore, metallic pigments or those having a metal-like appearance, such as aluminum, aluminum bronzes of different shades, copper, tungsten bronzes, antimony bronzes and arsenic sulfide bronzes, which are useful for metallics, are suitable. Examples of further suitable fillers are talc, mica, kaolin, chalk, ground quartz, ground asbestos, ground slate, barium sulfate, silicates, glass fibers, organic fibers or the like.

EXAMPLES

I. Preparation of the modified acid polyesters

I.1 294 g of maleic anhydride are melted under a nitrogen atmosphere and reacted between 60° C. and 100° C., at the end at 110° C. with 135 g of butane-1,4-diol until the acid number remains constant (432, calculated 392). The temperature is then increased to 120° C., and 336 g of sorbic acid are introduced in portions, during which the temperature is maintained and the batch remains homogeneous. Stirring at 120° C. to 150° C. is continued until the sorbic acid has completely reacted (checked by TLC or GPC). In order to remove any volatile components, vacuum is applied briefly at this temperature. An almost colorless, glassy-brittle mass is obtained. Acid number: 450, melting range 80° C. to 100° C. The product is soluble in all polar solvents suitable for the formulation of epoxy binders.

I.2 129 g of propane-1,2-diol and 336 g of sorbic acid are dissolved at 80° C. under nitrogen together with 900 g of xylene. After addition of 8 g of conc. sulfuric acid, the mixture is heated to 150° C., resulting in a vigorous separation of water. Once the amount of water which separates is constant (about 60 ml), the mixture is maintained at reflux, and 280 g of maleic anhydride are introduced in portions. The mixture is maintained at reflux for another 30 minutes, the xylene is then distilled off (at the end in vacuo), and the remaining melt is taken up in 745 g of ethoxyethyl acetate to give a brownish solution which can immediately be used as curing agent for solvent-containing binders, acid number aqueous: 427, acid number alcoholic: 342.

I.3 113 g of sorbic acid are reacted in the known manner with 98 g of maleic anhydride in the melt to give methylcyclohexene tricarboxylic anhydride. The mixture is taken up in 400 g of xylene, 42 g of propane-1,2-diol are added, and 0.2 g of zinc(II) acetate is introduced as the catalyst. The mixture is subjected to azeotropic distillation until a constant amount of water is obtained (12 ml). The xylene is distilled off, and the viscous residue is taken up while hot in 253 g of ethoxypropyl acetate to give a 50% solution having an aqueous acid number of 245, and an alcoholic acid number of 196. This means that the solution is an anhydride-containing mixture.

I.4 143.4 g of maleic anhydride are reacted at 60° C. to 100° C. with 46.6 g of ethane-1,2-diol, the reaction being clearly exothermic. After 1 hour, the acid number is constant: 448 (theor. 432). In a sample, only traces of free maleic anhydride and fumarate can be detected (nuclear magnetic resonance). 155.8 g of sorbic acid are now swiftly introduced, while simultaneously increasing the temperature to 125° C. After a vigorous exothermic reaction (cooling at 165° C.), the mixture is maintained at 125° C. until the sorbic acid has completely reacted (approximately 2 hours). Vacuum is applied at this temperature for 15 minutes. A very light-colored, brittle product, acid number 464, is obtained. The product is soluble in all polar solvents suitable for the formulation of epoxy binders.

I.5 147.1 g of maleic anhydride are reacted at 60° C. to 100° C. with 1.68 g of 1,1,1-trimethylolpropane and then with 46.6 g of ethane-1,2-diol, the reaction being clearly exothermic. After 1 hour, the acid number is constant: 449 (theor. 431). 155.8 g of sorbic acid are now slowly introduced, while simultaneously increasing the temperature to 120° C. After a weakly exothermic reaction, the mixture is maintained at 140° C. until the sorbic acid has completely reacted. Vacuum is applied at this temperature for 15 minutes. A very light-colored, brittle product, acid number 464, is obtained. The product is soluble in all polar solvents suitable for the formulation of epoxy binders.

I.6 59.1 g of hexane-1,6-diol are introduced at 65° C. to 70° C. into 98.1 g of maleic anhydride over a period of 20 minutes, the weakly exothermic reaction causing the temperature to rise to 80° C. The mixture is maintained at 110° C. until a constant acid number of 371 (theor. 357) is obtained, and 106.1 g of sorbic acid are slowly introduced at 120° C. to 140° C., the reaction being slightly exothermic. The mixture is maintained at 140° C. until no more free sorbic acid can be detected. The glass-clear, brittle, hardly yellowish product is soluble in all polar solvents suitable for the formulation of epoxy binders. A 50% solution in ethoxyethyl propionate has an acid number of 201.

I.7 147.1 g of maleic anhydride are reacted with 57.2 g of propane-1,2-diol at 60° C. to 100° C. until the acid number has reached a constant value of 470 (calculated 412), which takes about 4.5 hours. 168.2 g of sorbic acid are swiftly added in portions to the viscous, almost colorless mass, while heating to 120° C. The exothermic reaction causes the temperature to rise briefly to 190° C. leading to weak reflux. Stirring at 120° C. is continued for 1 hour to give a light-colored, somewhat tacky, brittle product of acid number 461. Hardly any free sorbic acid can be detected.

I.8 105.5 g of 1,1,1-trimethylolpropane are added at 100° C. to a mixture of 73.5 g of maleic anhydride and 150 g of succinic anhydride (gram-equivalent 1:2) over a period of 20 minutes. The exothermic reaction causes the temperature to rise to about 150° C., the mixture is then maintained at 130° C. until an acid number of 384 is reached. 79.8 g of sorbic acid are metered in at 110° C. over a period of 20 minutes; the temperature rises to 150° C. and is maintained for another 2 hours. The mixture is maintained at an aspirator vacuum for 15 minutes, and the thin melt is then poured off.

I.9 A melt of 147.1 g of maleic anhydride is reacted at 130° C. with 80.5 g of 2,2-dimethylpropane-1,3-diol until the acid number reaches a constant value of 381. 161.5 g of sorbic acid are then slowly metered in, and the mixture is maintained at 150°–160° C. for 2 hours. After briefly applying vacuum, a highly viscous melt is obtained. The brittle, almost colorless product has a melting range of 60° 70° C. 1.10 A mixture of 117.7 g of maleic anhydride and 40.0 g of succinic anhydride is reacted at 95° C. with 75.6 g of butane-1,4-diol until a constant acid number of 403 is reached. 127.8 g of sorbic acid are then added at 100° C., and the mixture is maintained at 130° C., at the end under vacuum, for about 3 hours.

The almost colorless product has a melting range of 17°–30° C.

I.11 184.0 g of maleic anhydride are reacted as usual at 100° C. with 145.3 g of triethylene glycol (catalyst DMAP), the yellow-brown mass reaching a constant acid number of 371 after 5 hours. The mixture is reacted at 160° C. with 200 g of sorbic acid for 2 hours, the reaction being strongly exothermic. At the end, an aspirator vacuum is applied for a short period. The yellowish product exhibits a melting range of 20°–30° C.

II. Preparation of the binders for can-coating/coil-coating

The curing agents according to Examples I.1; I.5; I.7; I.9; I.10 and I.11 were dissolved in ethoxyethyl propionate (concentration 50% by weight). The binder (epoxy resin based on bisphenol A and epichlorohydrin, average molecular weight 3,500 g/mol) was likewise dissolved in ethoxyethyl propionate (concentration 50% by weight). The solution of the curing agent was mixed with the epoxy resin solution at room temperature, and the resulting mixture was then maintained at 80° C. for 3 hours to effect precondensation. The relative amounts selected were such that the acid group/epoxy group equivalent ratio was 1.35:1.

These binders were knife-coated as clearcoats onto tin plate in the form of a 25 μm wet film and baked at 190° C. for 12 minutes. The baked film had a layer thickness of 5–8 μm. White finishes based on these binders can be formulated without problems.

All films displayed very good crosslinking (more than 100 acetone double rubs), very good adhesion and deformability.

Sterilization (1 hour at 129° C. in 2 % aqueous lactic acid) does not result in any loss of adhesion, and in particular binders 1 and 2 exhibit a good surface and hardly any deterioration in adhesion at the bead.

These products have achieved the standard quality of tin coat finishes based on epoxy resins and curing agents containing trimellitic acid.

What is claimed is:

1. A modified acid polyester obtained by reaction of polyols with unsaturated polycarboxylic acids or anhydrides thereof and conjugated dienoic acids.

2. A modified acid polyester as claimed in claim 1, wherein the relative amounts of polyol, unsaturated polycarboxylic acid (anhydride) and conjugate dienoic acid are selected whereby the hydroxyl equivalent/acid equivalent ratio of total number of hydroxy groups to the total number of carboxyl groups (wherein two are added for each one anhydride group) is from 1:0.8 to 0.8 to 1, and the ratio of total number of olefinic unsaturated groups in the unsaturated polycarboxylic acid component to the total number of conjugated diene groups in the dienoic acid component is from 1:0.8 to 0.8 to 1.

3. A process for preparing a modified acid polyester of claim 1 which comprises the following steps: (a) esterification of the polyol component and the unsaturated polycarboxylic acid component, and (b) cyclo addition of the conjugated dienoic acid component to the unsaturated polyester of step (a).

4. A process for preparing the modified acid polyester of claim 1 which comprises the following steps: (a) esterification of the polyol component and the conjugated dienoic acid component, and (b) cyclo addition of the unsaturated polycarboxylic acid component to the diene-containing polyester of step (a).

5. A process for preparing the modified acid polyester of claim 1 which comprises the following steps: (a) cyclo addition of the unsaturated polycarboxylic acid component and the conjugated dienoic acid component, and (b) esterification of the resulting adduct of step (a) with the polyol component.

6. The process of claim 3 for the manufacture of the modified acid polyester, wherein the unsaturated polycarboxylic acid component is a single unsaturated polycarboxylic acid, an anhydride thereof or a mixture of several unsaturated polycarboxylic acids or their anhydrides or mixtures of one or more unsaturated polycarboxylic acids and anhydrides thereof.

7. The process of claim 3 for the manufacture of the modified acid polyester, wherein the polyol component is a single polyol or a plurality of polyols selected from the group consisting of aliphatic, cycloaliphatic, and araliphatic polyhydric alcohols, alcohols, and polyhydric phenols.

8. The process of claim 3 for the manufacture of the modified acid polyester, wherein the conjugated dienoic acid component is a single compound or a plurality of such compounds.

9. The process of claim 4 for the manufacture of the modified acid polyester, wherein the unsaturated polycarboxylic acid component is a single unsaturated polycarboxylic acid, an anhydride thereof or a mixture of several unsaturated polycarboxylic acids or their anhydrides or mixtures of one or more unsaturated polycarboxylic acids and anhydrides thereof.

10. The process of claim 4 for the manufacture of the modified acid polyester, wherein the polyol component is a single polyol or a plurality of polyols selected from the group consisting of aliphatic, cycloaliphatic, and araliphatic polyhydric alcohols, and polyhydric phenols.

11. The process of claim 4 for the manufacture of the modified acid polyester, wherein the conjugated dienoic acid component is a single compound or a plurality of such compounds.

12. The process of claim 5 for the manufacture of the modified acid polyester, wherein the unsaturated polycarboxylic acid component is a single unsaturated polycarboxylic acid, an anhydride thereof or a mixture of several unsaturated polycarboxylic acids or their anhydrides or mixtures of one or more unsaturated polycarboxylic acids and anhydrides thereof.

13. The process of claim 5 for the manufacture of the modified acid polyester, wherein the polyol component is a single polyol or a plurality of polyols, selected from the group consisting of aliphatic, cycloaliphatic, and araliphatic polyhydric alcohols, and polyhydric phenols.

14. The process of claim 5 for the manufacture of the modified acid polyester, wherein the conjugated dienoic acid component is a single compound or a plurality of such compounds.

15. The modified acid polyester of claim 1, wherein the unsaturated polycarboxylic acid component is a single unsaturated polycarboxylic acid, an anhydride thereof or a mixture of several unsaturated polycarboxylic acids or their anhydrides or mixtures of one or more unsaturated polycarboxylic acids and anhydrides thereof.

16. The modified acid polyester of claim 1, wherein the polyol component is a single polyol or a plurality of polyols, selected from the group consisting of aliphatic, cycloaliphatic, and araliphatic polyhydric alcohols, and polyhydric phenols.

17. The modified acid polyester of claim 1, wherein the conjugated dienoic acid component is a single compound or a plurality of such compounds.

18. The modified acid polyester of claim 2, wherein the unsaturated polycarboxylic acid component is a single unsaturated polycarboxylic acid, an anhydride thereof or a mixture of several unsaturated polycarboxylic acids or their anhydrides or mixtures of one or more unsaturated polycarboxylic acids and anhydrides thereof.

19. The modified acid polyester of claim 2, wherein the polyol component is a single polyol or a plurality of polyols, selected from the group consisting of aliphatic, cycloaliphatic, and araliphatic polyhydric alcohols, and polyhydric phenols.

20. The modified acid polyester of claim 2, wherein the conjugated dienoic acid component is a single compound or a plurality of such compounds.

* * * * *